US007594238B2

(12) United States Patent
Takahashi

(10) Patent No.: US 7,594,238 B2
(45) Date of Patent: Sep. 22, 2009

(54) APPARATUS AND METHOD FOR DISPLAYING PLURALITY OF MESSAGES IN GROUPS TO REDUCE BURDEN ON OPERATORS

(75) Inventor: Daisaku Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/001,242

(22) Filed: Dec. 1, 2004

(65) Prior Publication Data

US 2006/0026134 A1 Feb. 2, 2006

(30) Foreign Application Priority Data

Jul. 30, 2004 (JP) ............................. 2004-223409

(51) Int. Cl.
*G06F 9/44* (2006.01)
*G06F 11/00* (2006.01)

(52) U.S. Cl. ........................... 719/318; 714/46; 714/47; 714/48

(58) Field of Classification Search ..................... 714/2, 714/48-54, 46, 47; 719/313, 318; 718/102, 718/104
See application file for complete search history.

(56) References Cited

U.S. PATENT DOCUMENTS

| | | | | |
|---|---|---|---|---|
| 5,291,590 | A * | 3/1994 | Ohnishi et al. | 714/49 |
| 5,432,715 | A * | 7/1995 | Shigematsu et al. | 702/188 |
| 5,666,294 | A * | 9/1997 | Takada et al. | 702/182 |
| 5,748,880 | A * | 5/1998 | Ito et al. | 714/46 |
| 5,794,239 | A * | 8/1998 | Walster et al. | 707/6 |
| 6,199,180 | B1 * | 3/2001 | Ote et al. | 714/31 |
| 6,269,460 | B1 * | 7/2001 | Snover | 714/48 |
| 6,336,139 | B1 | 1/2002 | Feridun et al. | |
| 7,451,446 | B2 * | 11/2008 | Noll et al. | 718/102 |
| 2002/0073195 | A1 | 6/2002 | Hellerstein et al. | |
| 2002/0169870 | A1 * | 11/2002 | Vosseler et al. | 709/224 |

FOREIGN PATENT DOCUMENTS

| | | |
|---|---|---|
| JP | 9-288601 | 11/1997 |
| JP | 10-171521 | 6/1998 |
| JP | 11-143743 | 5/1999 |
| JP | 2002-215430 | 8/2002 |
| JP | 2003-216457 | 7/2003 |
| JP | 2004-182520 | 2/2004 |
| JP | 2006-004346 | 1/2006 |
| WO | WO 94/19912 | 9/1994 |
| WO | 2004/061681 | 7/2004 |

* cited by examiner

*Primary Examiner*—Li B Zhen
*Assistant Examiner*—Charles E Anya
(74) *Attorney, Agent, or Firm*—Greer, Burns & Crain, Ltd.

(57) ABSTRACT

A message display method capable of allowing the contents of messages to be easily confirmed. A message receiver receives messages from programs. A grouping unit groups the messages received by the message receiver, into related messages. A schedule checking unit accesses a schedule memory storing a program operation schedule to determine whether the messages of each message group are the ones which are normally output from a running program. A group name retrieval unit retrieves group names to be given to the message groups based on the determination of the schedule checking unit. A group name output means displays the group names on a display unit.

5 Claims, 20 Drawing Sheets

15 SCHEDULE DB

| IDENTIFICATION NUMBER | START TIME | END TIME | PATTERN MANAGEMENT NUMBER | JOB NAME |
| --- | --- | --- | --- | --- |
| 0001 | 0:00 | 1:30 | 00004976 | JOB-B2 |
| 0002 | 1:30 | 2:00 | 00004978 | JOB-B2 |
| 0003 | 2:00 | 3:30 | 00006186 | JOB-BK2 |
| ... | ... | ... | ... | ... |

FIG. 7

16 NORMAL RULE CONDITION DB

| PATTERN MANAGEMENT NUMBER | MESSAGE NUMBER | mes1 | mes2 | mes3 | GROUP NAME |
|---|---|---|---|---|---|
| 00004976 | 2 | SSH | crmg ERR-1 | 5102 | [JOB-B2 BEING EXECUTED] 0:00 - 1:30 START BACKUP PROCESS. DATA IS BEING REGISTERED IN DB. |
| 00004976 | 2 | SSH | crmg ERR-1 | 5099 | |
| 00004978 | 2 | SSH | crmg ERR-1 | 5102 | IF JOB-B2 WHICH ENDS BETWEEN 0:00 - 1:30 DOES NOT END BY 2:00, JOB-BK2 WILL BE DISRUPTED. |
| 00004978 | 2 | SSH | crmg ERR-1 | 5099 | |
| ... | ... | ... | ... | ... | ... |

FIG. 8

18 ABNORMALITY CONDITION DB

| PATTERN MANAGEMENT NUMBER | MESSAGE NUMBER | mes1 | mes2 | mes3 | GROUP NAME |
|---|---|---|---|---|---|
| 00004988 | 2 | SSH | crmg ERR-1 | 5102 | COMMUNICATION WITH HEAD OFFICE SERVER (HOST) IS ENABLED (HOST-LINK SOFTWARE DOES NOT RUN) . |
| 00004988 | 2 | SSH | crmg ERR-1 | 5099 | |
| ... | ... | ... | ... | ... | ... |

| S-num | MESSAGE |
|---|---|
| 12···398 | amo···sjrg |

| S-num | CONVERTED MESSAGE | RULE ID |
|---|---|---|
| 57···985 | vsd···gith | 58···367 |

| Pat–num | MESSAGE NUMBER | MESSAGE INFORMATION | INFORMATION |
|---|---|---|---|
| 23···649 | 3···75 | fdj···pogh | ieu···dosi |

| Pat-num | CONVERTED MESSAGE |
|---|---|
| 23···942 | sag···fskg |

| Pat-num | MESSAGE NUMBER | ERROR INFORMATION | ERROR DETAILED INFORMATION |
|---|---|---|---|
| 47…958 | 5…03 | fdj…pgot | fgi…kgs |

| Pat-num | CONVERTED MESSAGE |
|---|---|
| 18···570 | srg···psld |

| Pat-num | START TIME | END TIME | MESSAGE NUMBER | MESSAGE INFORMATION | INFORMATION |
|---|---|---|---|---|---|
| 98…865 | 5:00 | 7:00 | 2…95 | sjg‥awoo | ewi‥jgis |

| | | | |
|---|---|---|---|
| 2002/7/12 0:28 | APPLICATION SERVER A | CRJCgetCLDBCBSImpl: SSH : crmg: ERR-1: 5102: Processing is interrupted by the error of incident collection CBM. | 82 |
| 2002/7/12 0:28 | APPLICATION SERVER A | com.fujitsu.eSupport.crms.cr.CRJArunCBSGetCLDB: SSH : crmg: ERR: 5099: The Incident collection CBS went wrong continuously. | |
| 2002/7/12 0:52 | WWW SERVER 5 | MpTrfExSub[2780]: [ID 615243 daemon.warning] Failed to open the following file. (in MpTrfExA) | 83 |
| 2002/7/12 1:34 | APPLICATION SERVER A | CRJCgetCLDBCBSImpl: SSH : crmg: ERR-1: 5102: Processing is interrupted by the error of incident collection CBM. | 84 |
| 2002/7/12 1:34 | APPLICATION SERVER A | com.fujitsu.eSupport.crms.cr.CRJArunCBSGetCLDB: SSH : crmg: ERR: 5099: The Incident collection CBS went wrong continuously. | |
| 2002/7/12 8:50 | APPLICATION SERVER C | IZ0C0008[27627]: [ID 958298 local0.error] SSH IW1A5024 ERR-2 0000 ERROR DUE TO NO REPRESENTATIVE USER ID | 85 |
| 2002/7/12 13:34 | APPLICATION SERVER A | CRJCgetCLDBCBSImpl: SSH : crmg: ERR-1: 5102: Processing is interrupted by the error of incident collection CBM. | 86 |
| 2002/7/12 13:34 | APPLICATION SERVER A | com.fujitsu.eSupport.crms.cr.CRJArunCBSGetCLDB: SSH : crmg: ERR: 5099: The Incident collection CBS went wrong continuously. | |

| | | | |
|---|---|---|---|
| 2002/7/12 0:10 | APPLICATION SERVER A | [JOB-B2 BEING EXECUTED] 0:00 – 1:30 START BACKUP PROCESS. DATA IS BEING REGISTERED IN DB. | 92 |
| 2002/7/12 0:52 | WWW SERVER 5 | MpTrfExSub[2780]: [ID 615243 daemon.warning] Failed to open the following file. (inMpTrfExA) | 93 |
| 2002/7/12 1:34 | APPLICATION SERVER A | IF JOB-B2 WHICH ENDS BETWEEN 0:00 – 1:30 DOES NOT END BY 2:00, JOB-BK2 WILL BE DISRUPTED. | 94 |
| 2002/7/12 8:50 | APPLICATION SERVER C | IZ0C0008[27627]: [ID 958298 local0.error] SSH IW1A5024 ERR-2 0000 ERROR DUE TO NO REPRESENTATIVE USER ID | 95 |
| 2002/7/12 13:34 | APPLICATION SERVER A | COMMUNICATION WITH HEAD OFFICE SERVER (HOST) IS ENABLED (HOST-LINK SOFTWARE DOES NOT RUN). | 96 |

FIG. 18

APPARATUS AND METHOD FOR DISPLAYING PLURALITY OF MESSAGES IN GROUPS TO REDUCE BURDEN ON OPERATORS

CROSS-REFERENCE TO RELATED APPLICATIONS

This application is based upon and claims the benefits of priority from the prior Japanese Patent Application No. 2004-223409, filed on Jul. 30, 2004, the entire contents of which are incorporated herein by reference.

BACKGROUND OF THE INVENTION (1) Field of the Invention

This invention relates to a message display method and apparatus and, more particularly, to a message display method and apparatus for displaying messages.

(2) Description of the Related Art

In a system composed of a plurality of computers connected to each other over a network, a large number of messages (event logs) are output, and when a trouble happens, more messages are output. Conventionally, methods of suppressing message output are used. For example, there is an event notification and suppression method capable of determining whether to notify occurrence of an event in real time, the event generated while a plant is operated or monitored (for example, refer to Japanese Unexamined Patent Publication No. 10-171521 (paragraph [0007]-[0008], FIG. 1)).

The conventional methods, however, have a drawback. If a large number of messages are travelling, an abnormal message is under them, which gets operators into trouble for specifying a trouble point.

SUMMARY OF THE INVENTION

This invention has been made in view of foregoing and proposes a message display method and apparatus capable of simply displaying a plurality of messages in groups to reduce a burden on operators.

To accomplish the above object, this invention provides a message display method of a message display apparatus for displaying messages. With this message display method, a message receiver receives messages from programs, a grouping unit groups the messages into related messages, a schedule checking unit determines whether the messages of each message group are the ones which are normally output from a running program out of the programs that run according to an operation schedule previously stored in a schedule memory, a group name retrieval unit retrieves group names to be given to the message groups, from a group name memory based on the determination result, and a group name output unit outputs the group names.

Further, to accomplish the above object, this invention provides a message display apparatus for displaying messages. This message display apparatus comprises: a message receiver for receiving messages from programs; a grouping unit for grouping the messages into related messages; a schedule checking unit for determining whether the messages of each message group are the ones which are normally output from a running program out of the programs that run according to an operation schedule previously stored in a schedule memory; a group name retrieval unit for retrieving group names to be given to the message groups, from a group name memory based on the determination result; and a group name output unit for outputting the group names.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows an example of data structure of a schedule database.

FIG. 8 shows an example of data structure of a normality condition database.

FIG. 9 shows an example of data structure of an abnormality condition database.

FIG. 10 shows an example of structure of data to be output from an information receiving block.

FIG. 11 shows an example of structure of data to be output from a rule extraction block.

FIGS. 12 and 13 show an example of structure of data to be output from a normal-pattern creation block.

FIGS. 14 and 15 show an example of structure of data to be output from an abnormal-pattern creation block.

FIG. 16 shows an example of structure of data to be referenced by a normal-pattern matching block based on the schedule database.

FIG. 17 shows an example of a screen to be displayed before messages are grouped.

FIG. 18 shows an example of a screen to be displayed after the messages are grouped.

DESCRIPTION OF THE PREFERRED EMBODIMENTS

A principle of this invention will be hereinafter described in detail with reference to the accompanying drawings.

Figure 1:
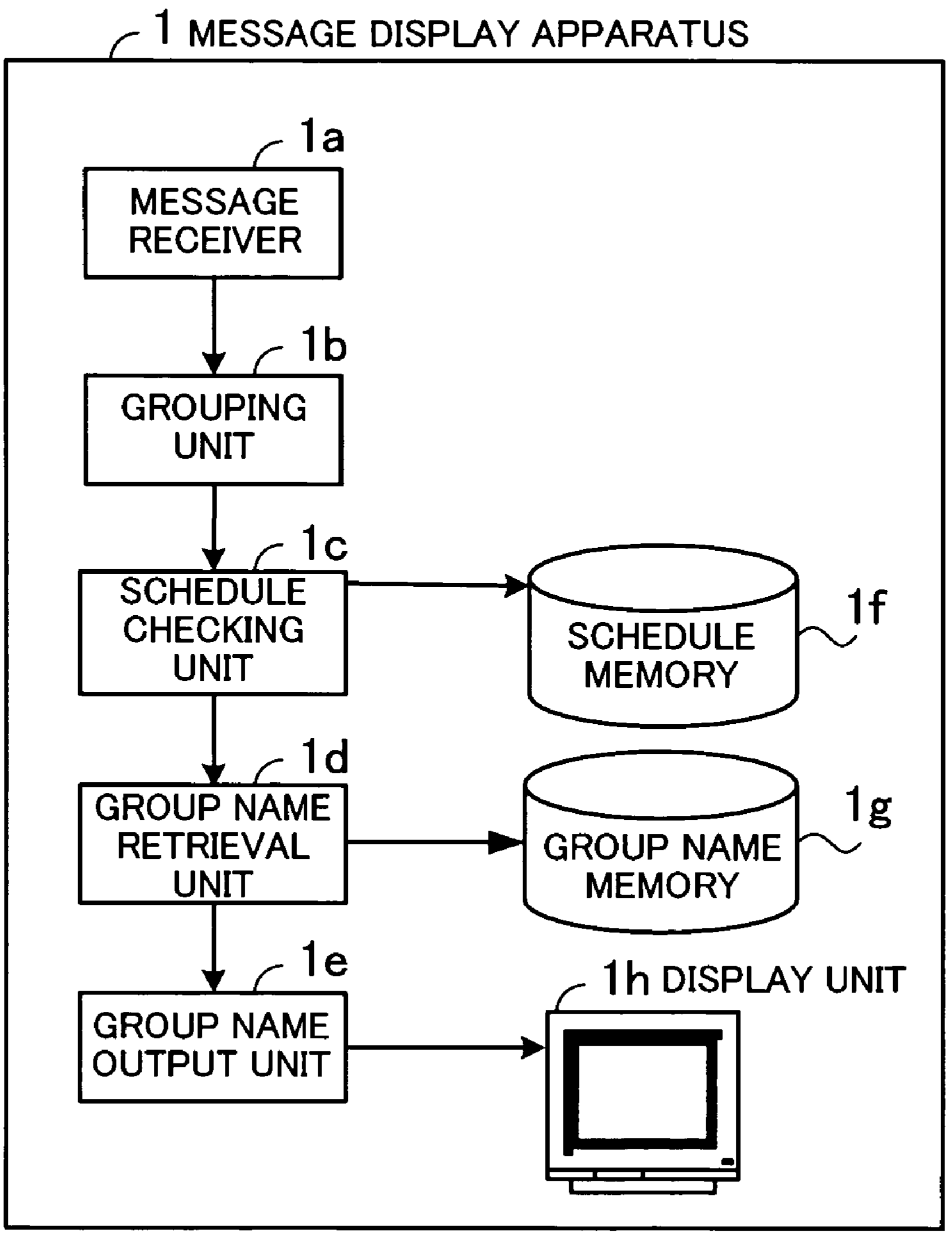
FIG. 1 explains a principle of a message display method.

FIG. 1 shows a principle of a message display method.

Referring to this figure, a message display apparatus 1 is composed of a message receiver 1*a*, a grouping unit 1*b*, a schedule checking unit 1*c*, a group name retrieval unit 1*d*, a group name output unit 1*e*, a schedule memory 1*f*, a group name memory 1*g*, and a display unit 1*h*.

The message receiver 1*a* receives messages from programs. The grouping unit 1*b* groups the messages received by the message receiver 1*a*, into related messages. The schedule checking unit 1*c* accesses the schedule memory 1*f* storing a program operation schedule, to determine whether the messages of each message group are the ones that are normally output from a running program. The group name retrieval unit 1*d* retrieves group names to be given to the message groups, from the group name memory 1*g* based on the determination results of the schedule checking unit 1*c*. For example, when the schedule checking unit 1*c* determines that the messages of a message group are the ones that are normally output from a running program, the group name retrieval unit 1*d* retrieves their group name corresponding to this normal situation. When the messages are the ones that should normally not be output from the running program, on the contrary, a group name indicating this abnormal situation is retrieved. The group name output means 1*e* displays the retrieved group names on the display unit 1*h*.

As described above, received messages are grouped, and it is determined by accessing the schedule memory 1*f* whether the messages of each message group are the ones that are normally output from a running program. Then their group name is retrieved based on the determination result and is displayed on the display unit 1*h*. That is, the display unit 1*h* displays group names obtained based on whether messages are normally output from the running program, so that operators can immediately recognize the messages, thus reducing a burden on them.

An embodiment of this invention will be now described in detail with reference to the accompanying drawings.

Figure 2:
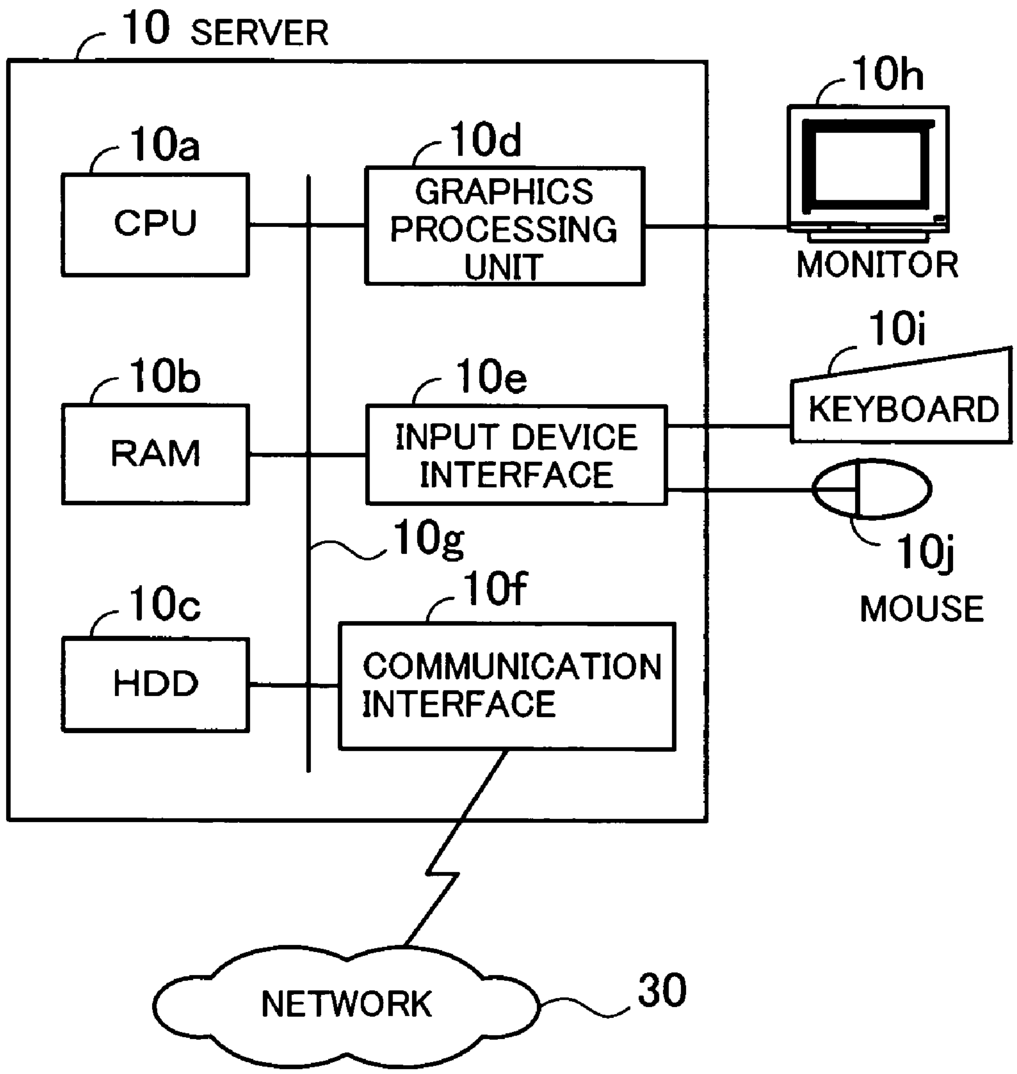
FIG. 2 shows hardware structure of a server.

FIG. 2 shows an example of hardware structure of a server. The message display apparatus 1 is realized by such a server.

Referring to this figure, the operation of the server 10 is entirely controlled by a Central Processing Unit (CPU) 10*a*. Connected to the CPU 10*a* via a bus 10*g* are a Random Access Memory (RAM) 10*b*, a Hard Disk Drive (HDD) 10*c*, a graphics processing unit 10*d*, an input device interface 10*e*, and a communication interface 10*f*.

The RAM 10*b* temporarily stores at least part of an Operating System (OS) program, middlewares, and a plurality of application programs for various processes, which are run by the CPU 10*a*. Further, the RAM 10*b* temporarily stores at least part of a middleware to collectively display a plurality of related messages output from a middleware or an application program as one message. Furthermore, the RAM 10*b* stores various data necessary for CPU processing. The HDD 10*c* stores the above OS, middlewares, application programs, and various data.

Connected to the graphics processing unit 10*d* is a monitor 10*h*. The graphics processing unit 10*d* displays images on a display screen of the monitor 10*h* under the control of the CPU 10*a*. Connected to the input device interface 10*e* are a keyboard 10*i* and a mouse 10*j*. The input device interface 10*e* transfers signals from the keyboard 10*i* and the mouse 10*j* to the CPU 10*a* through the bus 10*g*.

The communication interface 10*f* is connected to a network 30. The communication interface 10*f* realizes communication with a plurality of terminal devices over the network 30. The server 10 and the plurality of terminal devices execute various operations according to schedules, including batch processing of data received from the plurality of terminal devices. With the above hardware structure, the server 10 performs prescribed processes.

Figure 3:
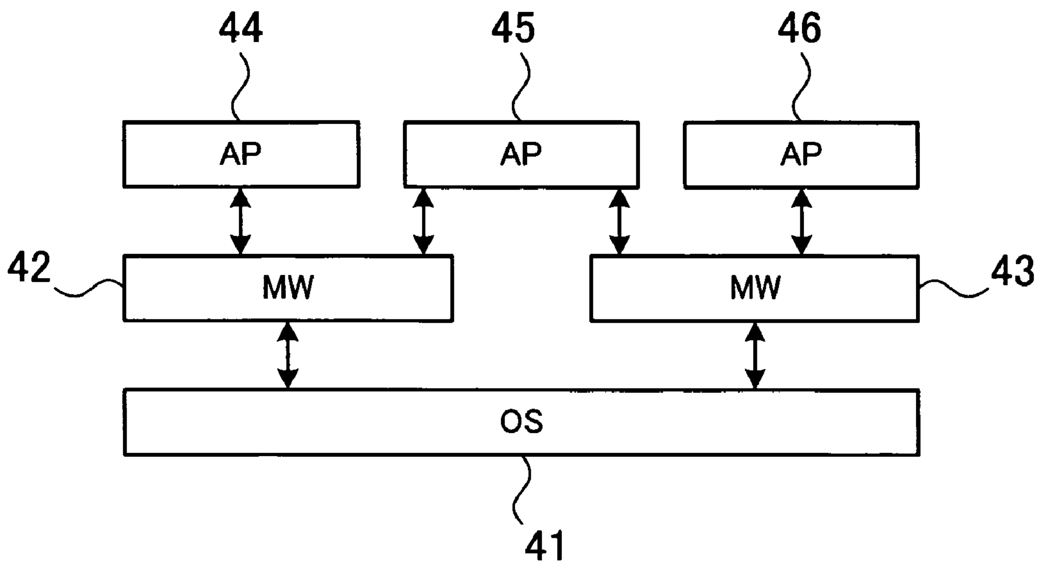
FIG. 3 shows software structure of the server.

An example of software structure of the server 10 will be now described with reference to FIG. 3.

Referring to this figure, middlewares 42 and 43 run on an operating system (OS) 41. An application program 44 runs on the middleware 42. An application program 45 runs on the middlewares 42 and 43. An application program 46 runs on the middleware 43.

The server 10 groups and outputs a large number of messages received from the application programs 44 to 46 and the middlewares 42 and 43, which run according to a program operation schedule, by message output patterns so as to display them in an easy-viewable manner. Even if messages in the same pattern are output from the middlewares 42 and 43, it can be determined based on the operation schedule what operations (which application programs) the messages relate to. Specifically, by checking the operation schedule to find operations which were executed when the messages were output, middlewares outputting the messages can be detected.

The functions of the server 10 will be now described with reference to FIG. 4.

Referring to this figure, the functions of the server 10 include: information reception 11; message reformation 12; rule extraction 13; normal-pattern matching 14; a schedule database 15; a normality condition database 16; abnormal-pattern matching 17; an abnormality condition database 18; message display 19; information acceptance display 20; management 21; abnormal-pattern creation 22; group name creation 23; normal-pattern creation 24; and countermeasure display 25.

The information receiving block 11 receives massages from application programs and middlewares one by one. The information receiving block 11 assigns a unique number to each received message and outputs the message to the message reformation block 12. For example, in an order of arrival, the messages are sequentially given unique numbers from 1. Note that the information receiving block 11 receives messages from application programs and middlewares running on terminal devices connected to the server 10 as well.

At a stage where the information receiving block 11 receives a message, it cannot be known what the message indicates. The message reformation block 12 analyzes the message received by the information receiving block 11, and then converts it into a format suitable for the subsequent functional blocks' processing. Specifically, the message reformation block 12 detects which program outputted the message and what message code is included. Then the message reformation block 12 converts the message's format. The message reformation block 12 outputs the converted message to the rule extraction block 13. Note that the information receiving block 11 can display received messages on the monitor 10*h* as they are if requested from an operator.

The rule extraction block 13 finds the output patterns of messages which are received from the message reformation block 12 one by one. As an example of an output pattern, messages A, B and C are output from the message reformation block 12 in order. The rule extraction block 13 groups the messages received from the message reformation block 12, by the detected output patterns. For example, the rule extraction block 13 groups messages which were issued due to a lack of memory and the subsequent stop of a middleware or an application, as one message group. Note that an existing technique can be used to group messages.

The normal-pattern matching block 14 accesses the normality condition database 16 to determine whether the messages of each message group created by the rule extraction block 13 are normal messages. Normal messages are messages that are normally output while application programs and middlewares correctly run. For example, assume that a virus checking application program outputs a message notifying that a system file out of files to be checked cannot be opened. If this system file is protected from being written or accessed, such a message is normally output and is predictable. In other words, such messages are normally output while the virus checking application program runs, and are identified as normal messages which do not cause any trouble in operation. Even if messages indicate abnormal situations, they can be identified as normal messages if they are normally output while a program correctly runs.

The normality condition database 16 is a database that is accessed by the normal-pattern matching block 14 to determine whether the messages of each message group created by the rule extraction block 13 are normal messages.

In addition, the normal-pattern matching block 14 accesses the schedule database 15 to determine whether the messages of each message group created by the rule extraction block 13 were output at predictable times. For example, assume that the schedule database 15 indicates that an application program A runs from 3:00 to 4:00 and messages regarding a different application program B are output during this period. Even if these messages are grouped by the rule extraction block 13, they are determined as not a normal message group because the application program B should not run when the messages were output. When the normal-pattern matching block 14 determines they are a normal message group by accessing the normality condition database 16 and the schedule database 15, it retrieves the pattern management number of the message group and outputs it to the message display block 19. When the normal-pattern matching block 14 determines they are not a normal message group, on the contrary, it outputs this message group to the abnormal-pattern matching block 17.

The schedule database 15 is a database storing information including times for programs, an order of the programs, and pattern management numbers for messages which associate schedule database 15 with the normality condition database 16. For example, this schedule database 15 indicates when a program does a job A and when the program does a job B.

Figure 5:
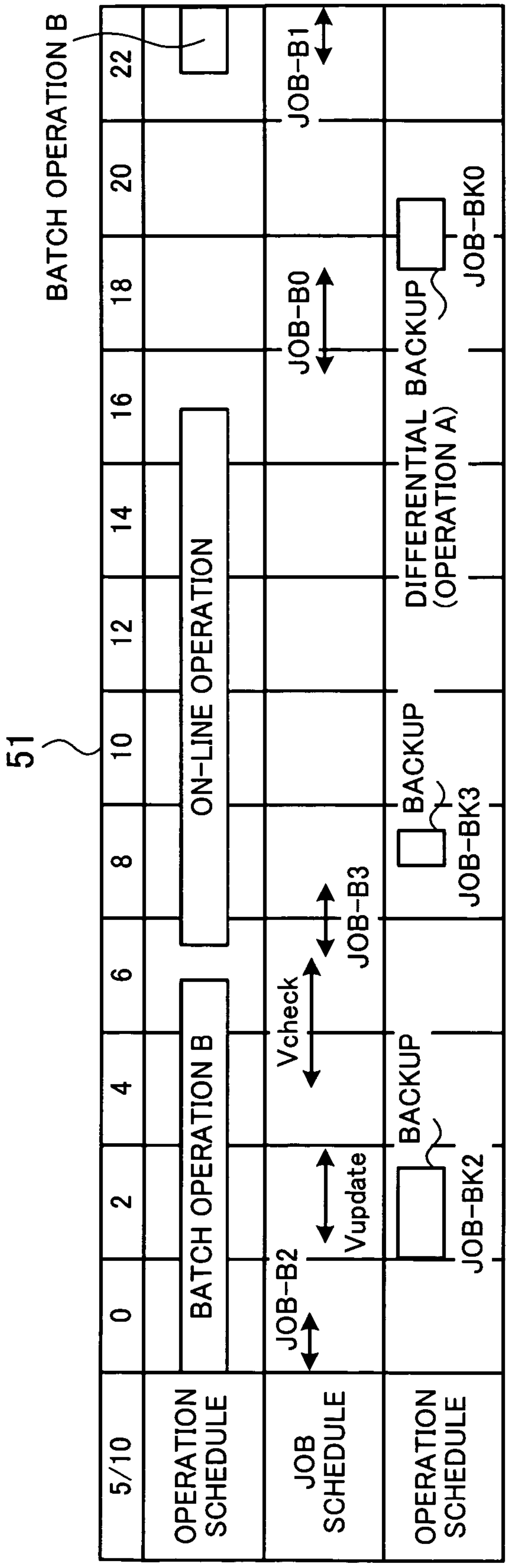
FIG. 5 explains an example of an operation schedule.

FIG. 5 explains an example of an operation schedule.

The server 10 and terminal devices connected to the server 10 operate according to operation schedules 51 shown in FIG. 5. For example, JOB-B0 checks the data delivery status of each branch. In addition, JOB-B0 detects the number of data delivered from each branch because the data is used in a batch operation B. JOB-B1 confirms consistency of data accumulated in a non-line operation A, and performs the batch operation B. JOB-B2 reflects processed data on databases. JOB-B3 creates reports for JOB-B1 results. JOB-BK0 makes a differential backup for process logs relating to the on-line operation A. JOB-BK2 makes a differential backup for data reflected on the databases in JOB-B2. JOB-BK3 backs up the reports created in JOB-B3, in a database. Vupdate automatically updates virus patterns. Vcheck scans the server 10 to detect virus. Programs run to perform various operations according to such an operation schedule.

If the normal-pattern matching block 14 determines that the messages of a message group created by the rule extraction block 13 are not normal messages, the abnormal-pattern matching block 17 accesses the abnormality condition database 18 to determine whether they are abnormal messages. If yes, the abnormal-pattern matching block 17 retrieves the pattern management number of the message group and outputs it to the message display block 19. Note that abnormal messages may not be grouped. Abnormal messages are messages that should normally not be output while programs correctly run according to the operation schedule, and for example, are messages that are issued when programs do not correctly run or messages that are issued to notify situations that affect the system, despite the schedule.

The abnormality condition database 18 is a database that is accessed by the abnormal-pattern matching block 17 to determine whether the messages of a message group created by the rule extraction block 13 are abnormal messages.

The message display block 19 retrieves a group name to be given to the normal message group or the abnormal message group from the normality condition database 16 or the abnormality condition database 18 based on the pattern management number received from the normal-pattern matching block 14 or the abnormal-pattern matching block 17 and displays the group name on the monitor 10*h*.

The information acceptance display block 20 displays a screen to receive a command from an operator, on the monitor 10*h*. The command is to display a screen describing the contents of each message of a message group in detail, a screen to edit the group name of a message group, or a screen to enter countermeasures taken in response to an abnormal message.

Figure 6:
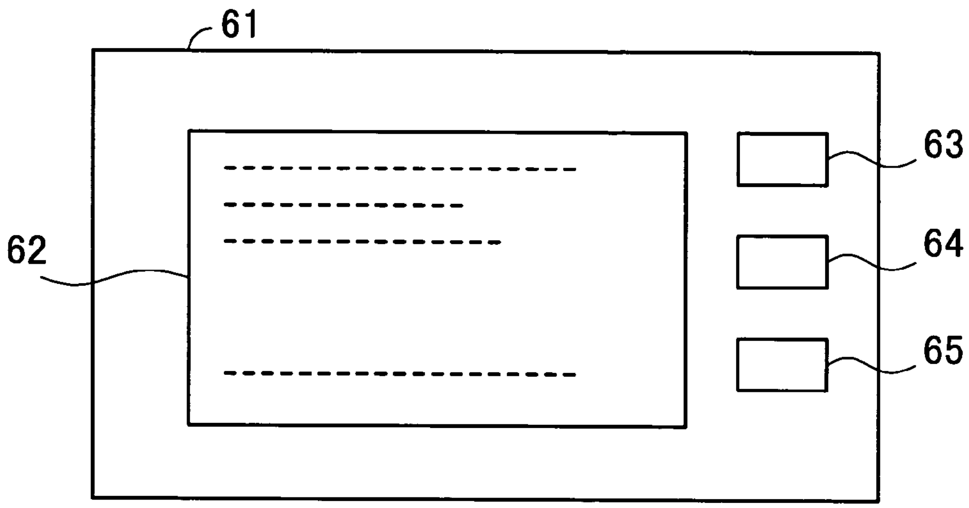
FIG. 6 shows an example of a screen to receive a command from an operator.

FIG. 6 shows an example of a screen to receive a command from an operator.

As shown in FIG. 6, the screen 61 to be displayed on the monitor 10*h* comprises a region 62 to display group names, and buttons 63 to 65.

Pressing the button 63 displays a screen describing the contents of the message group of a selected group name in detail. Pressing the button 64 displays a screen to edit a group name. Pressing the button 65 displays a screen to enter countermeasures taken in response to an abnormal message.

When the operator enters countermeasures taken in response to an abnormal message, on a screen appearing by pressing the button 65, the management block 21 outputs the abnormal message and the countermeasures to the abnormal-pattern creation block 22 in association with each other.

The abnormal-pattern creation block 22 stores the abnormal message and the countermeasures in association with each other, in the abnormality condition database 18 via the abnormal-pattern matching block 17. At this time, a pattern management number is assigned and stored. By repeating this storage, information to be used by the abnormal-pattern matching block 17 to detect abnormal messages is accumulated.

When the operator edits a group name on a screen appearing by pressing the button 64, the group name creation block 23 associates the new group name with the message group. When the operator does not edit the group name, the message group keeps the original group name. The group name creation block 23 outputs the message group and the group name to the normal-pattern creation block 24.

The normal-pattern creation block 24 stores the message group and the new group name in the schedule database 15 and the normality condition database 16 via the normal-pattern matching block 14. At this time, a pattern management number is assigned and stored. By repeating this storage, information to be used by the normal-pattern matching block 14 to determine whether the messages of each message group output from the rule extraction block 13 are normal messages is accumulated.

When the abnormal-pattern matching block 17 detects an abnormal pattern and corresponding countermeasures are stored in the abnormality condition database 18, the countermeasure display block 25 displays the countermeasures on the monitor 10*h*.

The data structures of the schedule database 15, the normality condition database 16, and the abnormality condition database 18 will be now described in detail.

FIG. 7 shows the data structure of the schedule database.

Referring to FIG. 7, the schedule database 15 comprises at least columns for identification number, start time, end time, pattern management number, and job name. The operation schedule 51 of FIG. 5 is managed in the form of this schedule database 15 of FIG. 7.

The identification number column stores identification numbers to identify job operations. The start and end time columns indicate when the job operations start and end. The pattern management number column stores the pattern management numbers of message groups to which messages output by the jobs belong. The job name column stores the names of the jobs.

FIG. 8 shows the data structure of the normality condition database.

Referring to FIG. 8, the normality condition database 16 comprises columns for pattern management number, message number, mes1 to mes3, and group name.

The pattern management number column stores pattern management numbers given to message groups. The message number column is used to indicate the number of messages in each message group with a pattern management number. The mes1 to mes3 columns contain keywords to classify messages. If a message includes keywords, the message is decided as a normal message. The group name column stores group names to be given to normal message groups.

FIG. 9 shows the data structure of the abnormality condition database.

Referring to FIG. 9, the abnormality condition database 18 comprises columns for pattern management number, message number, mes1 to mes3, and group name.

The pattern management number column stores pattern management numbers given to message groups. The message number column is used to indicate the number of messages in each message group with a pattern management number. The mes1 to mes3 columns store keywords to classify messages. If a message includes keywords, the message is decided as an abnormal message. The group name column stores group names to be given to abnormal message groups.

Figure 4:
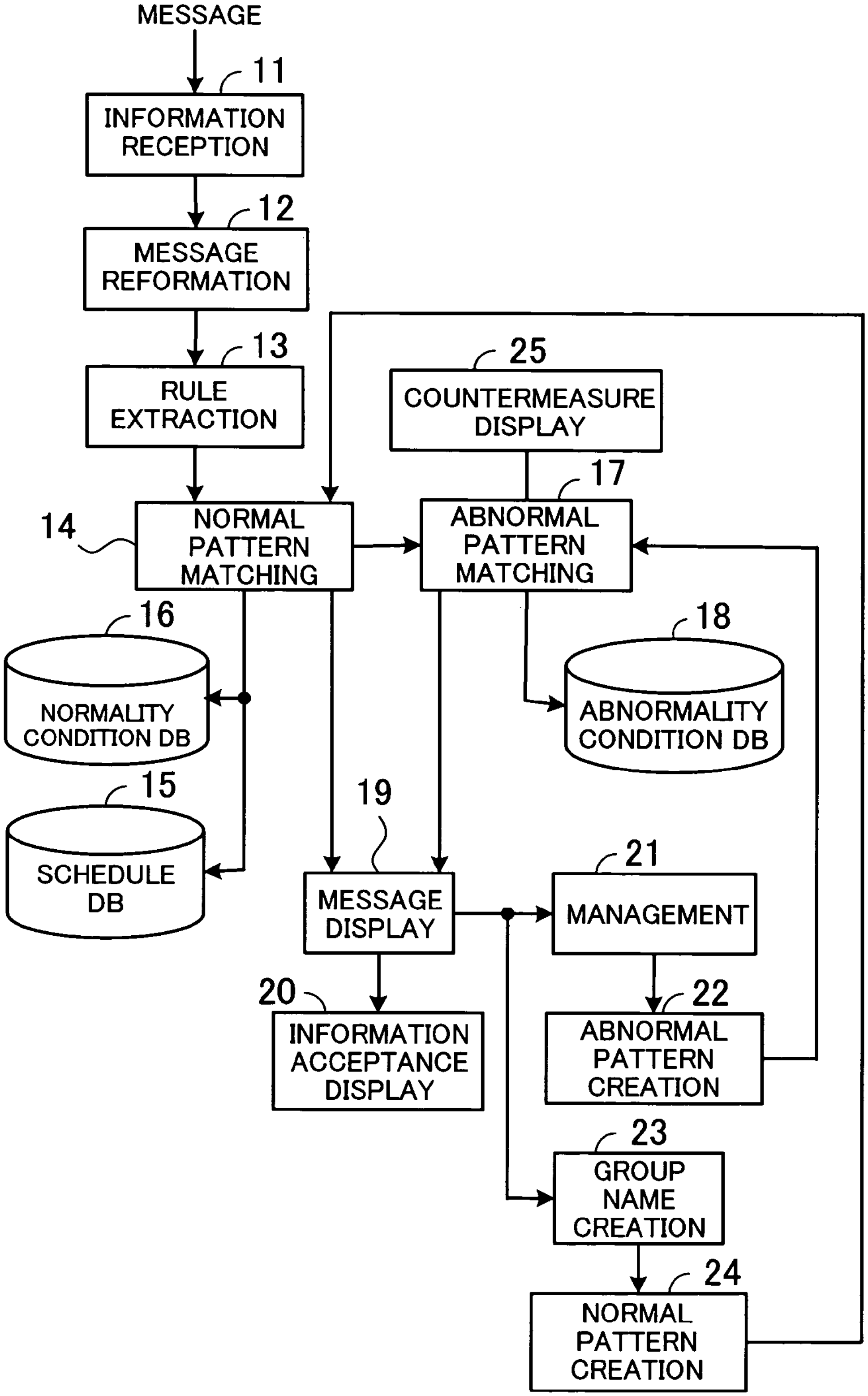
FIG. 4 is a functional block diagram of the server.

Structures of data which is processed in the blocks of the server 10 of FIG. 4 will be now described. An example of a structure of data to be output from the information receiving block 11 will be first described with reference to FIG. 10.

Figure 10:
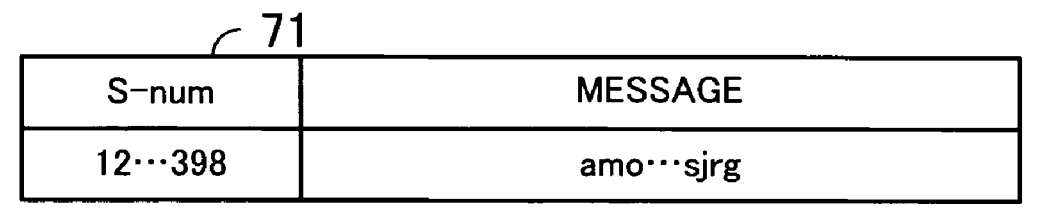

Referring to FIG. 10, the data 71 is divided into an S-num region and a message region. The S-num region contains a 12-digit number assigned by the information receiving block 11. The message region contains a message received by the information receiving block 11. This message is represented by 256 letters.

A structure of data to be output from the rule extraction block 13 will be now described with reference to FIG. 11.

Referring to FIG. 11, the data 72 is divided into an S-num region, a converted message region, and a rule ID region. The S-num region contains a number assigned by the information receiving block 11. The converted message region contains a message of a prescribed format converted by the message reformation block 12, the message including information on a program outputting this message and information on a message code. The converted message is represented by 128 letters. The rule ID region contains an 8-digit identification number given to the messages of a message group. That is, messages with the same rule ID can be grouped.

A structure of data to be output from the normal-pattern creation block 24 will be now described with reference to FIG. 12.

Referring to FIG. 12, the data 73 is divided into a Pat-num region, a message number region, a message information region and an information region. The Pat-num region stores an 8-digit pattern management number given to a message group. The message number region is used to indicate the number of messages in the message group. This number of messages is represented by a 4-digit number. The message information region stores a group name assigned to the message group. This group name is represented by 128 letters. The information region stores information consisting of 128 letters to supplement the message group.

A structure of different data to be output from the normal-pattern creation block 24 will be now described with reference to FIG. 13.

Referring to FIG. 13, the data 74 is divided into a Pat-num region and a converted message region. The Pat-num region stores an 8-digit pattern management number given to a message group. The converted message region stores a converted message of the message group. The converted message is represented by 128 letters.

From the normal-pattern creation block 24, the data 73 shown in FIG. 12 is first output as header information. Then the data 74 shown in FIG. 13 is output for each converted message of the message group.

A structure of data to be output from the abnormal-pattern creation block 22 will be now described with reference to FIG. 14.

Referring to FIG. 14, the data 75 is divided into a Pat-num region, a message number region, an error information region, and an error detailed information region. The Pat-num region stores an 8-digit pattern management number assigned to a message group. The message number region is used to indicate the number of messages in the message group. The number of messages is represented by a 4-digit number. The error information region stores information consisting of 128 letters to indicate the contents of an error. The error detailed information region stores information consisting of 128 letters to indicate countermeasures for the error.

A structure of different data to be output from the abnormal-pattern creation block 22 will be now described with reference to FIG. 15.

Referring to FIG. 15, the data 76 is divided into a Pat-num region and a converted message region. The Pat-num region stores an 8-digit pattern management number assigned to a message group. The converted message region stores a converted message of the message group. The message is represented by 128 letters.

From the abnormal-pattern creation block 22, the data 75 shown in FIG. 14 is first output as header information. Then the data 76 shown in FIG. 15 is output for each converted message of the message group.

A structure of data to be referenced by the normal-pattern matching block 14 based on the schedule database 15 will be now described with reference to FIG. 16.

Referring to FIG. 16, the data 77 has a Pat-num region, a start time region, an end time region, a message number region, a message information region, and an information region. The Pat-num region stores an 8-digit pattern management number assigned to a message group. The start time region indicates when an application program starts. The end time region indicates when the application program ends. The message number region is used to indicate the number of messages in the message group to be issued by the application program. The number of messages is represented by a 4-digit number. The message information region stores the group name given to the message group of this application program. This group name is represented by 128 letters. The information region stores information consisting of 128 letters to supplement the message group.

An example of a screen to be displayed on the monitor **10*h*** will be now described.

FIG. 17 shows an example of a screen to be displayed before messages are grouped.

The screen 81 shown in FIG. 17 displays messages 82 to 86 received by the information receiving block 11. The messages 82 to 86 are given output dates and times. This screen 81 is displayed by the information receiving block 11.

Assume now that the messages 82 and 84 are messages that are output in JOB-B2 described with reference to the operation schedule 51 of FIG. 5. These messages seem like they indicate errors. However, assume that these messages indicate that a specified middleware is purposefully stopped to decrease loads in the backup process, and are normally output in JOB-B2. That is, these messages are identified as normal messages when they were output at predictable times specified by the schedule database 15. In addition, assume that the messages 86 are messages that are registered in the abnormality condition database 18. The messages 83 and 85 are the ones that are not registered in the normality condition database 16, not predictable from the operation schedule 51, and not registered in the abnormality condition database 18.

The rule extraction block 13 groups the messages 82 to 86 entering the information receiving block 11, by application programs or by message attributes.

The normal-pattern matching block 14 determines whether the messages of each message group are normal messages. If yes, this block 14 retrieves the pattern management number of the message group and outputs it to the message display block 19. If no, on the contrary, the block 14 outputs the message group to the abnormal-pattern matching block 17. The abnormal-pattern matching block 17 determines whether the messages of the message group are abnormal messages. If yes, this block 17 retrieves the pattern management number of the message group and outputs it to the message display block 19.

The message display block 19 retrieves a group name to be given to the normal message group or the abnormal message group, from the normality condition database 16 or the abnormality condition database 18 based on the received pattern management number, and displays it on the monitor 10*h*.

FIG. 18 shows an example of a screen to be displayed after the messages are grouped.

The screen 91 shown in FIG. 18 displays messages 92 to 96 created by grouping the messages 82 to 86 displayed on the screen 81 of FIG. 17.

The two messages 82 on the screen 81 of FIG. 17 can be grouped and are determined based on the operation schedule 51 as predictable messages. Therefore, these messages 82 are identified as normal messages, and are indicated as the message 92 with a group name indicating a normal situation on the screen 91.

The messages 84 on the screen 81 are messages output by JOB-B2 behind time specified by the operation schedule 51 (but managed by the schedule database 15). Therefore, on the screen 91, these messages 84 are indicated as the message 94 with a group name indicating that a next job may be disrupted.

The messages 86 of the screen 81 have the same contents as messages which are output by JOB-B2, but they were output behind time specified by the operation schedule 51 and were not actually output by JOB-B2. Therefore, these messages 86 can be determined as error messages which were issued because a trouble happened. Since the messages 86 are not predictable from the operation schedule but can be grouped based on the abnormality condition database 18, these messages are indicated as the message 96 with a group name indicating the abnormal situation on the screen 91.

The messages 83 and 85 of the screen 81 are not registered in the normality condition database 16, not predictable from the operation schedule 51, and not registered in the abnormality condition database 18. Therefore, as the messages 93 and 95 on the screen 91, these abnormal messages 83 and 85 are displayed as they are.

The operation of the server 10 of FIG. 4 will be now described with reference to the flowcharts of FIGS. 19 and 20.

At step S1, the information receiving block 11 receives messages from application programs, middlewares, and terminal devices connected to the server 10. An operation schedule indicating a procedure of server operation is previously stored in the schedule database 15. Note that the information receiving block 11 displays received messages on the monitor 10*h* as they are if requested from an operator.

At step S2, the message reformation block 12 converts a message received by the information receiving block 11, into a format suitable for subsequent functional blocks' processing.

At step S3, the rule extraction block 13 detects output patterns of messages which are output from the message reformation block 12 one by one. The rule extraction block 13 groups the messages by the output patterns.

At step S4, the normal-pattern matching block 14 accesses the schedule database 15 to determine whether the messages of each message group were issued at predictable times (whether the messages are predictable from the schedule being used by the server 10).

At step S5, the normal-pattern matching block 14 accesses the normality condition database 16 to determine whether the messages of each message group are normal messages.

At step S6, the normal-pattern matching block 14 moves on to step SP7 when it is determined at step S4 and S5 that the messages are predictable and normal messages; and to step S8, otherwise.

At step S7, the normal-pattern matching block 14 retrieves the pattern management number of the message group from the normality condition database 16.

At step S8, the abnormal-pattern matching block 17 determines whether the message group is included in the abnormality condition database 18.

At step S9, the abnormal-pattern matching block 17 moves on to step S10 when it is determined at step S8 that the message group is included in the abnormality condition database 18; and to step S13, otherwise.

At step S10, the abnormal-pattern matching block 17 retrieves the pattern management number of the message group from the abnormality condition database 18.

At step S11, the message display block 19 retrieves a group name to be given to the message group, from the normality condition database 16 or the abnormality condition database 18 based on the pattern management number obtained at step S7 or S10.

At step S12, the message display block 19 assigns the retrieved group name to the message group.

At step S13, the message display block 19 displays the group name assigned to the message group on the monitor 10*h*. Messages that are decided at step S9 as not belonging to any group are displayed as they are. In this way, related messages are collectively displayed, so that the operator can easily confirm the messages that the server 10 received.

At step S14, the information acceptance display block 20 displays a screen allowing the operator to enter a command. The command is to display a screen describing the message group of a selected group name in detail, a screen to edit a group name, or a screen to enter countermeasures taken in response to an abnormal message. When the operator requests for displaying the message group of a selected group name in detail, the information acceptance display block 20 moves on to step S15. When the operator requests for editing a group name, the block 20 moves on to step S17. When the operator requests for entering countermeasures taken in response to an abnormal message, the block 20 moves on to step S18.

At step S15, the message display block 19 accepts the group name selected by the operator.

At step S16, the message display block 19 displays each message with the group name selected by the operator, on the monitor 10*h*.

At step S17, the group name creation block 23 accepts the group name edited by the operator and associates it with the message group. If the operator does not change the group name, the message group keeps its group name. The group name creation block 23 outputs the message group and the group name to the normal-pattern creation block 24.

At step S18, the management block 21 receives the countermeasures taken in response to the abnormal message, from the operator, and associates it with the abnormal message.

At step S19, the management block 21 outputs a pattern of the countermeasures associated with the abnormal message to the abnormal-pattern creation block 22.

Figure 19:
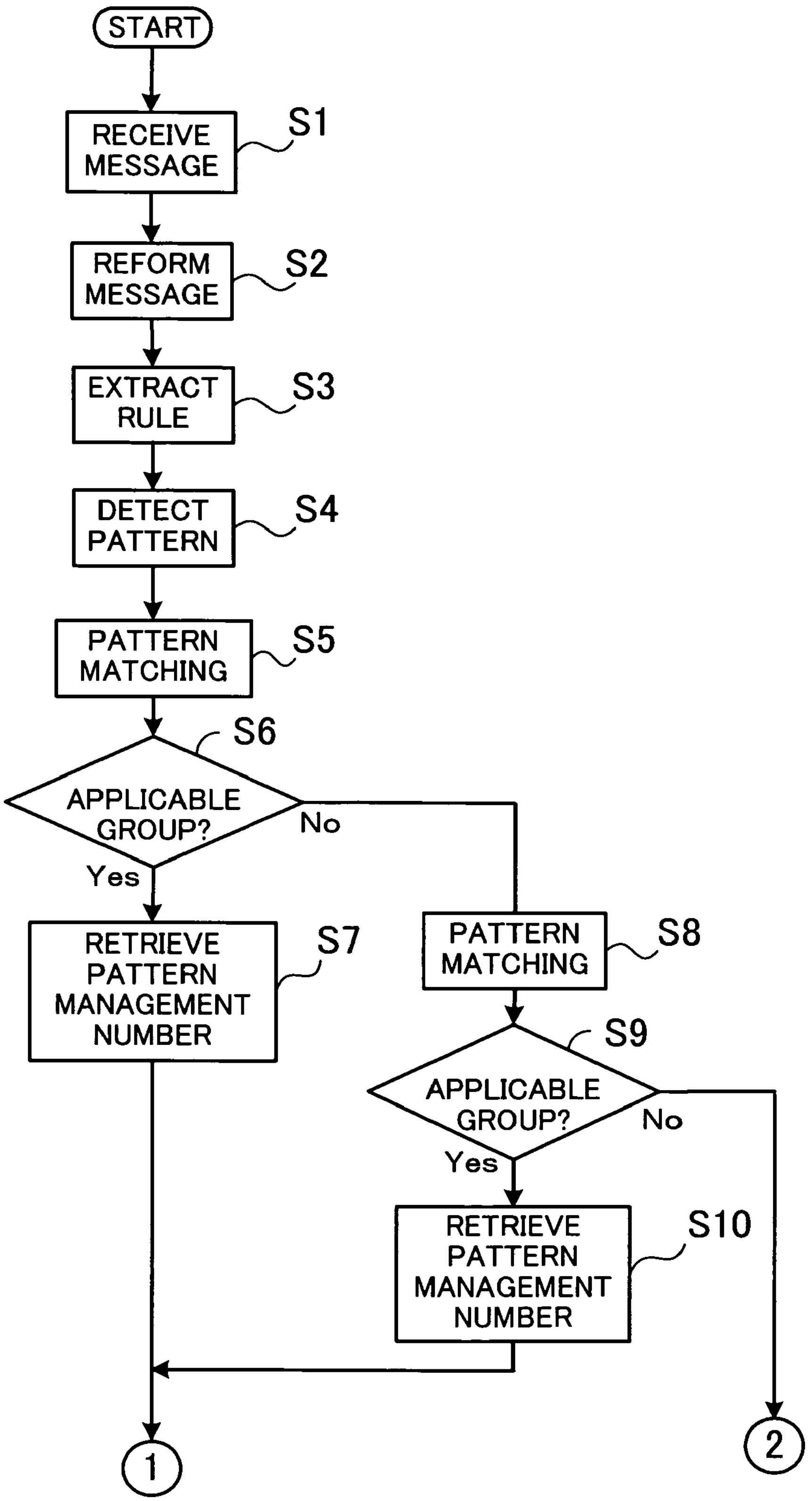
FIGS. 19 and 20 are flowcharts showing a flow of server operation.
Figure 20:
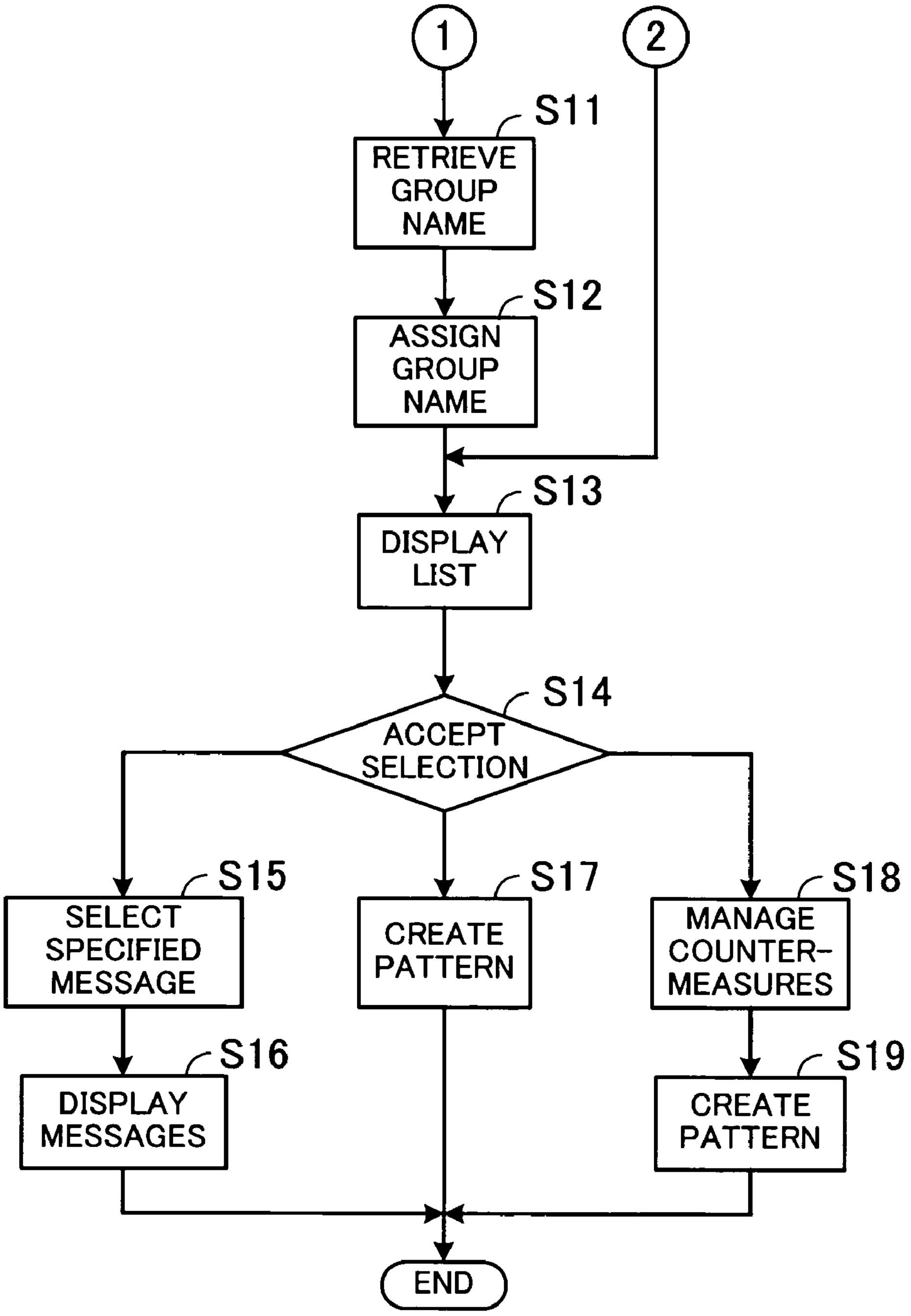

When the abnormal-pattern matching block 17 detects an abnormal pattern and corresponding countermeasures are stored in the abnormality condition database 18, the countermeasures can be displayed on the monitor 10*h*, which is not shown in the flowcharts of FIGS. 19 and 20.

As described above, received messages are grouped and it is determined based on the schedule database 15 whether the messages are the ones that are normally output from a running program. Then group names are obtained based on the determination result and are displayed on the monitor 10*h*. As a result, the monitor 10*h* displays the group names of the message groups obtained based on whether the messages are normally output from the running program, so that operators can confirm the messages easily and a burden on them can be reduced.

For example, consider now a case where a message indicating a communication error is output from a program. If the communication error normally happens while the program runs, this message is determined as a message which are normally output from the running program and therefore can be indicated as a normal message, so that the operators can confirm the message easily.

As another example, when an error message is output from a middleware which is used by a plurality of application programs, it cannot be determined from only the error message which application program outputted the message. However, by finding a running program from the schedule database 15, an application program which issued the message can be detected.

There is such a case that the information receiving block 11 does not receive messages which should be received. For example, consider a case where messages A, B, and C should be received from the message reformation block 12 but the message C is missing. In this case, the normal-pattern matching block 14 assigns a group name indicating that the message group will be processed later. The monitor 10*h* displays this notification.

The above-described processing functions are actually implemented on a computer with a program describing processing contents of the intended functions. This program is stored in a computer-readable storage medium. Suitable computer-readable storage media include magnetic storage media, optical discs, magneto-optical storage media, and semiconductor memory devices. Magnetic storage media include hard disk drives (HDD), flexible disks (FD), and magnetic tapes. Optical discs include digital versatile discs (DVD), DVD-random access memory (DVD-RAM), compact disc read-only memory (CD-ROM), CD-recordable (CD-R), CD-rewritable (CD-RW). Magneto-optical storage media include magneto-optical discs (MO).

The computer runs the program by locally storing the program from a portable recording medium or transferred from a server computer. Alternatively, the computer runs the program while reading the program from a portable recording medium or while receiving the program from the server computer.

According to the message display method of this invention, received messages are grouped and it is determined by accessing the schedule memory 1*f* whether the messages of each message group are the ones that are normally output from a running program. Then their group name is obtained based on the determination and is output. Therefore, the group names of the message groups obtained based on whether the messages are normally output from the running program are displayed, so that operators can easily confirm the messages and a burden on them can be reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A message display method of a message display apparatus for displaying messages, comprising:

storing an operation schedule that defines start and end times of scheduled programs, together with patterns of keywords that are expected to appear in messages generated by the scheduled programs;

receiving messages from a program and recording reception times thereof;

grouping the received messages into a message group, depending on relationships thereof;

determining whether messages of the message group are those expected to be output from a program running during a scheduled time period thereof, by comparing the reception times of the messages with the start and end times defined in the operation schedule, in addition to comparing the messages with the patterns of keywords defined in the operation schedule;

retrieving a group name corresponding to the message group, from a first group name storage unit when said determination shows that the messages are those expected to be output, and from a second group name storage unit when said determination shows otherwise;

outputting the group name in place of the messages originally received;

accepting countermeasures taken in response to a message indicating an abnormal situation, from an operator and storing the countermeasures in a countermeasure storage unit; and displaying the countermeasures being stored in the countermeasure storage unit on a display unit when said determination shows that messages of the message group are not those expected to be output.

2. The message display method according to claim 1, further comprising editing a group name according to operator operation.

3. The message display method according to claim 2, further comprising storing the group name edited in one of the group name storage units.

4. A message display apparatus for displaying messages, comprising:

schedule storage means for storing an operation schedule that defines start and end times of scheduled programs, together with patterns of keywords that are expected to appear in messages generated by scheduled programs;

message receiving means for receiving messages from a program and recording reception times thereof;

grouping means for grouping the received messages into a message group, depending on relationships thereof;

schedule checking means for determining whether messages of the message group are those expected to be output from a program during a scheduled time period thereof, by comparing reception times of the messages with the start and end times defined in the operation schedule, in addition to comparing the messages with the patterns of keywords defined in the operation schedule stored in the schedule storage means;

first and second group name storage means for storing group names;

group name retrieval means for retrieving a group name corresponding to the message group, from the first group name storage means when the determination results of the schedule checking means show that the messages are those expected to be output, and from the second group name storage means when the determination results of the schedule checking means show otherwise;

group name output means for outputting the group name in place of the messages originally received;

countermeasure acceptance means for accepting countermeasures taken in response to a message indicating an abnormal situation, from an operator;

countermeasure storage means for storing the countermeasures; and display means for displaying the countermeasures being stored in the countermeasure storage means on a display unit when the schedule checking means determines that messages of the message group are not those expected to be output.

5. A computer-readable storage medium containing a message display program to display messages, the message display program causing a computer to function as:

schedule storage means for storing an operation schedule that defines start and end times of scheduled programs, together with patterns of keywords that are expected to appear in messages generated by scheduled programs;

message receiving means for receiving messages from a program and recording reception times thereof;

grouping means for grouping the received messages into a message group, depending on relationships thereof;

schedule checking means for determining whether messages of the message group are those expected to be output from a program during a scheduled time period thereof, by comparing the reception times of the messages with the start and end times defined in the operation schedule in the schedule storage means, in addition to comparing the messages with the patterns of keywords defined in the operation schedule;

first and second group name storage means for storing group names;

group name retrieval means for retrieving a group name corresponding to the message group, from the first group name storage means when the determination results of the schedule checking means show that the messages are those expected to be output, and from the second group name storage means when the determination results of the schedule checking means show otherwise;

group name output means for outputting the group name in place of the messages originally received;

countermeasure acceptance means for accepting countermeasures taken in response to a message indicating an abnormal situation, from an operator;

countermeasure storage means for storing the countermeasures; and display means for displaying the countermeasures being stored in the countermeasure storage means on a display unit when the schedule checking means determines that messages of the message group are not those expected to be output.

* * * * *